US008013074B2

(12) United States Patent
Keoshkerian et al.

(10) Patent No.: US 8,013,074 B2
(45) **Date of Patent: *Sep. 6, 2011**

(54) TONER PROCESS

(75) Inventors: Barkev Keoshkerian, Thornhill (CA); Raj Patel, Oakville (CA); Edward G. Zwartz, Mississauga (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/111,746

(22) Filed: Apr. 29, 2008

(65) Prior Publication Data

US 2008/0213687 A1 Sep. 4, 2008

Related U.S. Application Data

(62) Division of application No. 10/989,492, filed on Nov. 17, 2004, now Pat. No. 7,615,327.

(51) Int. Cl.
*C08C 1/00* (2006.01)
*C08C 19/22* (2006.01)
*C08F 2/16* (2006.01)

(52) U.S. Cl. ........ 525/382; 525/385; 525/386; 526/217; 526/218.1; 523/335; 524/800; 524/804; 430/109.1; 430/137.1; 430/137.15

(58) Field of Classification Search .................. 430/137, 430/137.14, 137.17, 120, 109.1, 137.1, 137.15; 524/35, 556, 571, 458, 502, 505, 800, 804; 526/75, 73, 82, 86–87, 88, 72, 89, 217, 218.1, 526/219; 525/244, 50, 55, 382, 383, 374, 525/379, 385, 390, 391
See application file for complete search history.

(56) References Cited

U.S. PATENT DOCUMENTS

| | | | | |
|---|---|---|---|---|
| 3,590,000 A | | 6/1971 | Palermiti et al. | |
| 3,741,943 A | | 6/1973 | Sekmakas | |
| 3,800,588 A | | 4/1974 | Larson et al. | |
| 3,944,493 A | | 3/1976 | Jadwin et al. | |
| 3,998,907 A | | 12/1976 | DiGiulio | |
| 4,007,293 A | | 2/1977 | Mincer et al. | |
| 4,079,014 A | | 3/1978 | Burness et al. | |
| 4,298,672 A | | 11/1981 | Lu | |
| 4,394,430 A | | 7/1983 | Jadwin et al. | |
| 4,464,452 A | | 8/1984 | Gruber et al. | |
| 4,480,021 A | | 10/1984 | Lu et al. | |
| 4,560,635 A | | 12/1985 | Hoffend et al. | |
| 4,656,112 A | | 4/1987 | Kawagishi et al. | |
| 4,659,641 A | * | 4/1987 | Mahalek et al. | 430/137.17 |
| 4,788,123 A | | 11/1988 | Berkes et al. | |
| 4,828,956 A | | 5/1989 | Creatura et al. | |
| 4,845,003 A | | 7/1989 | Kiriu et al. | |
| 4,880,432 A | | 11/1989 | Egan et al. | |
| 4,894,308 A | | 1/1990 | Mahabadi et al. | |
| 4,912,009 A | | 3/1990 | Amering et al. | |
| 4,937,157 A | | 6/1990 | Haack et al. | |
| 4,948,686 A | | 8/1990 | Koch et al. | |
| 4,963,455 A | | 10/1990 | Laing et al. | |
| 4,965,158 A | | 10/1990 | Gruber et al. | |
| 5,278,020 A | | 1/1994 | Grushkin et al. | |
| 5,290,654 A | | 3/1994 | Sacripante et al. | |
| 5,308,734 A | | 5/1994 | Sacripante et al. | |
| 5,338,638 A | | 8/1994 | Tsuchiya et al. | |
| 5,344,738 A | | 9/1994 | Kmiecik-Lawrynowicz et al. | |
| 5,346,797 A | | 9/1994 | Kmiecik-Lawrynowicz et al. | |
| 5,348,832 A | | 9/1994 | Sacripante et al. | |
| 5,364,729 A | | 11/1994 | Kmiecik-Lawrynowicz et al. | |
| 5,366,841 A | | 11/1994 | Patel et al. | |
| 5,370,963 A | | 12/1994 | Patel et al. | |
| 5,376,172 A | | 12/1994 | Tripp et al. | |
| 5,403,693 A | | 4/1995 | Patel et al. | |
| 5,405,728 A | | 4/1995 | Hopper et al. | |
| 5,418,108 A | | 5/1995 | Kmiecik-Lawrynowicz et al. | |
| 5,482,812 A | | 1/1996 | Hopper et al. | |
| 5,484,677 A | * | 1/1996 | Inaba | 430/110.1 |
| 5,496,676 A | | 3/1996 | Croucher et al. | |
| 5,501,935 A | | 3/1996 | Patel et al. | |
| 5,527,658 A | | 6/1996 | Hopper et al. | |
| 5,585,215 A | * | 12/1996 | Ong et al. | 430/108.2 |
| 5,593,807 A | | 1/1997 | Sacripante et al. | |
| 5,604,076 A | | 2/1997 | Patel et al. | |
| 5,622,806 A | | 4/1997 | Veregin et al. | |

(Continued)

FOREIGN PATENT DOCUMENTS

| | | |
|---|---|---|
| CN | 1062218 | 6/1992 |

(Continued)

OTHER PUBLICATIONS

"Jeffamine amines and other polyether compounds." HUNTSMAN, pp. 1-2, 2001.*

*Primary Examiner* — Vasu Jagannathan
*Assistant Examiner* — Hannah Pak
(74) *Attorney, Agent, or Firm* — MH2 Technology Law Group LLP

(57) ABSTRACT

The present disclosure relates to a toner process comprising providing a resin miniemulsion comprising polymeric particles comprising at least one free radical polymerizable monomer compound and at least one alkylene anhydride; blending the miniemulsion with at least one colorant, at least one amine, and optionally at least one wax; heating the resulting mixture below or about equal to the glass transition temperature (Tg) of the resin emulsion; and heating the resulting mixture above or about equal to the glass transition temperature (Tg) of the resin emulsion.

4 Claims, No Drawings

U.S. PATENT DOCUMENTS

| | | | | | |
|---|---|---|---|---|---|
| 5,648,193 | A | | 7/1997 | Patel et al. | |
| 5,650,255 | A | | 7/1997 | Ng et al. | |
| 5,650,256 | A | | 7/1997 | Veregin et al. | |
| 5,658,704 | A | | 8/1997 | Patel et al. | |
| 5,660,965 | A | | 8/1997 | Mychajlowskij et al. | |
| 5,723,253 | A | | 3/1998 | Higashimo et al. | |
| 5,744,520 | A | | 4/1998 | Kmiecik-Lawrynowicz et al. | |
| 5,747,215 | A | | 5/1998 | Ong et al. | |
| 5,763,133 | A | | 6/1998 | Ong et al. | |
| 5,766,817 | A | * | 6/1998 | Cheng et al. | 430/137.14 |
| 5,766,818 | A | | 6/1998 | Smith et al. | |
| 5,804,349 | A | | 9/1998 | Ong et al. | |
| 5,827,633 | A | | 10/1998 | Ong et al. | |
| 5,840,462 | A | | 11/1998 | Foucher et al. | |
| 5,852,151 | A | | 12/1998 | Burroway et al. | |
| 5,853,944 | A | | 12/1998 | Foucher et al. | |
| 5,863,698 | A | | 1/1999 | Patel et al. | |
| 5,869,215 | A | | 2/1999 | Ong et al. | |
| 5,902,710 | A | | 5/1999 | Ong et al. | |
| 5,910,387 | A | | 6/1999 | Mychajlowskij et al. | |
| 5,916,725 | A | | 6/1999 | Patel et al. | |
| 5,919,595 | A | | 7/1999 | Mychajlowskij et al. | |
| 5,922,501 | A | | 7/1999 | Cheng et al. | |
| 5,925,488 | A | | 7/1999 | Patel et al. | |
| 5,945,245 | A | * | 8/1999 | Mychajlowskij et al. | 430/137 |
| 5,952,144 | A | | 9/1999 | Hasegawa et al. | |
| 5,977,210 | A | | 11/1999 | Patel et al. | |
| 6,004,714 | A | | 12/1999 | Ciccarelli et al. | |
| 6,017,671 | A | | 1/2000 | Sacripante et al. | |
| 6,132,924 | A | | 10/2000 | Patel et al. | |
| 6,136,490 | A | | 10/2000 | Ogawa et al. | |
| 6,136,492 | A | | 10/2000 | Hardy, Jr. et al. | |
| 6,143,457 | A | | 11/2000 | Carlini et al. | |
| 6,190,815 | B1 | | 2/2001 | Ciccarelli et al. | |
| 6,203,957 | B1 | * | 3/2001 | Nomura et al. | 430/110.4 |
| 6,203,961 | B1 | * | 3/2001 | Pan et al. | 430/114 |
| 6,210,853 | B1 | | 4/2001 | Patel et al. | |
| 6,214,507 | B1 | | 4/2001 | Sokol et al. | |
| 6,309,787 | B1 | * | 10/2001 | Cheng | 430/137.14 |
| 6,352,810 | B1 | * | 3/2002 | Jiang et al. | 430/137.11 |
| 6,469,094 | B1 | | 10/2002 | Keoshkerian et al. | |
| 6,962,764 | B2 | * | 11/2005 | Vanbesien et al. | 430/137.14 |
| 2002/0187415 | A1 | * | 12/2002 | Jiang et al. | 430/137.14 |
| 2003/0219668 | A1 | * | 11/2003 | Silence et al. | 430/108.21 |
| 2005/0042535 | A1 | * | 2/2005 | Vanbesien et al. | 430/110.3 |
| 2006/0105261 | A1 | * | 5/2006 | Keoshkerian et al. | 430/109.3 |
| 2008/0199802 | A1 | * | 8/2008 | Keoshkerian et al. | 430/137.15 |
| 2008/0213687 | A1 | | 9/2008 | Keoshkerian et al. | |

FOREIGN PATENT DOCUMENTS

| | | |
|---|---|---|
| JP | 06506261 | 7/1994 |
| JP | 200081730 | 3/2000 |
| WO | 9304407 | 3/1993 |
| WO | 00/75194 | 12/2000 |

* cited by examiner

TONER PROCESS

CROSS-REFERENCE TO RELATED APPLICATION

The present application is a divisional of application Ser. No. 10/989,492, now U.S. Pat. No. 7,615,327, filed on Nov. 17, 2004, the disclosure of which is hereby incorporated by reference in its entirety.

FIELD

The present disclosure relates to toners, uses and processes thereof.

REFERENCES

U.S. Pat. No. 4,880,432 describes a process for preparing colored polymeric particles wherein two or more different dyes may be covalently bonded to the polymeric particle subsequent to the particle synthesis.

U.S. Pat. No. 4,912,009 describes a dry toner formed by suspension polymerizing a styrene-acrylic monomer mixture in the presence of a polyester-promoted colloidal silica suspending agent which is free of other hydrophilic polymers.

U.S. Pat. No. 5,852,151 describes toner resins made by emulsion polymerization utilizing diacid cycloaliphatic emulsifiers.

U.S. Pat. No. 5,952,144 describes a process for producing toner comprising subjecting a monomer composition to suspension polymerization in an aqueous dispersion medium to prepare colored polymer particles as the core component and adding at least one monomer for a shell component.

U.S. Pat. No. 6,136,490 describes a polymerized toner comprising a polymer particle obtained by polymerizing a monomer for a shell, which monomer has a glass transition temperature higher than that of the polymer forming a core particle.

U.S. Pat. No. 6,136,492 describes a process for producing a polymer comprising emulsion polymerizing a vinyl aromatic monomer, conjugated diene monomers, and an acrylate monomer, in the presence of a diacid cycloaliphatic emulsifier to produce the polymer.

U.S. Pat. No. 6,469,094 describes a process for the preparation of polymeric particulate materials employing a free radical polymerizable monomer, a free radical initiator and a stable free radical compound wherein the process includes a first bulk polymerization where controlled initiation and limited or partial monomer polymerization is accomplished for the purpose of preparing a prepolymer mixture followed by a second stage miniemulsion polymerization where substantially complete monomer polymerization is accomplished.

Polymers used in known resin applications usually comprise acrylic acid-containing monomers. These polymers may then be aggregated via, for example, the polyaluminum chloride (PAC) procedure. However, acrylic acid containing monomers may be difficult to incorporate into the stable free radical polymerization process, such as in combination with styrene. The present disclosure describes a process for preparing latexes using a stable free radical polymerization process, whereby the latexes can then be aggregated and coalesced into toner particles.

SUMMARY

In aspects of the disclosure, there is provided a process comprising a first heating of a latomer mixture comprising at least one free radical polymerizable monomer, and at least one alkylene anhydride; a second heating of the latomer mixture to form polymeric particles; and combining at least one amine with the polymeric particles, wherein the second heating is at a higher temperature than the first heating; a toner process comprising providing a resin miniemulsion comprising polymeric particles comprising at least one free radical polymerizable monomer compound and at least one alkylene anhydride; blending the miniemulsion with at least one colorant, at least one amine, and optionally at least one wax; heating the resulting mixture below or about equal to the glass transition temperature (Tg) of the resin emulsion; and heating the resulting mixture above or about equal to the glass transition temperature (Tg) of the resin emulsion; and a process for latex preparation comprising a first heating of a latomer mixture comprising at least one free radical polymerizable monomer to low conversion and then adding at least one alkylene anhydride; a second heating of the latomer mixture to low conversion; a third heating of the latomer mixture to form polymeric particles; and combining at least one amine with the polymeric particles. Moreover, further aspects of the disclosure relate to the toner products obtained from the processes illustrated herein.

DESCRIPTION OF VARIOUS EMBODIMENTS

The disclosed process allows for the preparation of latexes that may be able to aggregate and coalesce into toner particles.

The present disclosure describes a process for latex preparation comprising a first heating of a latomer mixture comprising at least one free radial polymerizable monomer, and at least one alkylene anhydride; a second heating of the latomer mixture to form polymeric particles; and combining at least one amine with the polymeric particles.

The first heating of the first mixture can be at a polymerization temperature of, for example, from about 50° C. to about 145° C., and more specifically for example of from about 120° C. to about 130° C., for a duration of, for example, from about 5 minutes to about 4 hours, and more specifically from about 20 minutes to about 1 hour. The heating conditions can vary depending on, for example, the scale of the reaction and the results desired.

The at least one free radical polymerizable monomer may include a functional group, and may be selected from the group consisting of known free radical polymerizable monomers, for example, unsaturated monomers, such as styrenic monomers (such as styrenesulfonic acids, 4-vinylbenzoic acids), conjugated compounds, 9-vinyl carbazole compounds, vinyl chloride compounds, vinyl acetate compounds, acrylic.monomers and its derivatives of the formula $(CH_2{=}CH)COOR\text{-}COOH$ (where the R group can be a spacer aliphatic group to for example to impart different hydrophilicity), such as butylacrylate, ethyl acrylate, hydroxyethylacrylate; methacrylates and their derivatives of the formula $(CH_2{=}CCH_3)COORCOOH$ (where the R group can be a spacer aliphatic group to for example impart different hydrophilicity) such as methylmethacrylate, butylmethacrylate; and the like; and mixtures thereof. The at least one free radical polymerizable monomer may be present in the latomer mixture in an amount of, for example, from about 85% to about 99% by weight relative to the at least one alkylene anhydride.

The at least one free radical polymerizable monomer may copolymerize with the at least one alkylene anhydride. For example, the at least one free radical polymerizable monomer, such as styrene, may copolymerize with, for example, maleic anhydride (MA) in a 1:1 ratio. In embodiments, the copolymerization may result in a polymer having the formula (A-B)n, wherein A is the at least one stable free radical polymerizable monomer and B is the at least one alkylene anhydride. When the at least one free radical polymerizable monomer is present in the first mixture in an excess of the at least one alkylene anhydride, then it is believed that polymerization may occur until all the at least one alkylene anhydride is consumed and then polymerization of the remainder of the at least one free radical polymerizable monomer continues. In embodiments, the first mixture may have three populations of polymers such as, for example, poly(styrene/MA), poly(styrene/MA-b-styrene) block copolymers, and polystyrene.

The at least one alkylene anhydride may be any anhydride with a double bond so long as the anhydride is able to polymerize with the at least one free radical polymerizable monomer. Non-limiting examples of the at least one alkylene anhydride include maleic anhydride, 2,3-dialkylmaleic anhydride such as 2,3-dimethylmaleic anhydride, 2,3-diphenylmaleic anhydride, tetrahydrophthalicanhydride, n-methylisatoic and the like, as well as mixtures thereof. In the latomer mixture, wherein latomer refers, for example, to a latex mixture, each ingredient (e.g., monomer, and alkylene anhydride) may be of only one type or may be composed of two or more types. The at least one alkylene anhydride may be present in the latomer mixture in an amount of, for example, from about 0.1% to about 20% by weight relative to the at least one free radical polymerizable monomer.

In embodiments, the ingredients of the latomer mixture and the heating conditions for the latomer mixture are selected in order to perform a bulk polymerization or solution polymerization of the at least one free radical polymerizable monomer and the at least one alkylene anhydride.

The latomer mixture may also optionally comprise at least one free radical initiator which may be selected from the group consisting of peroxide compounds and diazo compounds such as, for example, benzoyl peroxide, di-(t-butyl) peroxide, 4,4'-azobisvaleronitrile, and 4,4'-azobis(cyanohexane), hydrogen peroxide, t-butyl hydroperoxide, 2,2'-azobis (2-amidinopropane)dihydrochloride, 2,2'-azobis(2-methylpropionamidine)dihyd roch loride, 4,4' azobis(4-cyanovaleric acid), 4,4'-azobis(4-cyanopentanoic acid), potassium persulfates and aminopersulfates. The at least one free radical initiator may be soluble in an immiscible liquid. The at least one free radical initiator may be present in an amount of, for example, from about 0.01% to about 5%, more specifically for example from about 1% to about 3% by weight relative to the at least one free radical polymerizable monomer.

The latomer mixture may be dispersed in an immiscible liquid with at least one surfactant. The immiscible liquid may be any aqueous solution or mixture, such as water, so long as the liquid does not dissolve the monomer or prepolymer resin contained in the latomer mixture.

The at least one surfactant can be selected from the group consisting of anionic, cationic, amphoteric, and nonionic surfactants customarily used in emulsion polymerization. In embodiments, the at least one surfactant may be an ionic surfactant, which class of surfactants may be generally better suited to the higher temperatures associated with the present processes. Nonlimiting examples of anionic surfactants include alkylaryl sulfonates, alkali metal alkyl sulfates, sulfonated alkyl esters, fatty acid soaps, and the like, such as sodium alpha-olefin ($C_{14}$-$C_{16}$) sulfonates. Exemplary surfactants are alkali metal alkylaryl sulfonates. In embodiments, suitable anionic surfactants include alkyl sulfonate salts or arylalkyl sulfonate salts, for example, dodecylbenzenesulfonic acid sodium salt ("SDBS"). A listing of suitable stabilizing compounds, such as surfactants, which may be useful in the inventive process is found in the book "McCutcheon's Emulsifiers and Detergents 1981 Annual", which is incorporated by reference herein in its entirety.

The at least one surfactant can be employed in varying amounts providing that a satisfactory miniemulsion is achieved by, for example, exceeding the critical micelle concentration (CMC). The at least one surfactant can be present in an amount of from about 1 to about 10 weight percent, for example from about 2 to about 5 weight percent, and as a further example from about 2 to about 3 weight percent, based on the weight of the immiscible liquid.

At least one stabilizer can be optionally added to further minimize diffusion due to Oswald ripening. The at least one stabilizer may be a compound having a low water solubility, or may be substantially insoluble, such as long chain hydrocarbons with from about 10 to about 40 carbon atoms, and for example from about 15 to about 25 carbon atoms, alcohols, mercaptans, carboxylic acids, ketones, amines, hydrocarbons or any other long chain molecules, with or without functional groups that do not substantially interfere with the stable free radical or miniemulsion chemistry, for example, dodecyl mercaptan, hexadecane, cetyl alcohol, and the like, and mixtures thereof. The at least one stabilizer may be in a mole ratio of from about 0.004 to about 0.08, and for example from about 0.005 to about 0.05 with respect to the monomer. The at least one stabilizer may be in a mole ratio of from about 0.1 to about 10, and for example from about 0.5 to about 5 with respect to the at least one stabilizing compound.

The dispersed latomer mixture may then be subjected to high shear to form a miniemulsion. In embodiments, the term "miniemulsion" refers to an aqueous dispersion of relatively stable hydrophobic droplets of less than about 1.5 μm in diameter, for example less than about 1 μm in diameter. The shearing can be accomplished by a variety of high shear mixing devices, for example, a piston homogenizer, a microfluidizer, a polytron, an ultrasonicator, static mixers and the like devices. In embodiments, the miniemulsion may be formed for instance in a piston homogenizer at from about 1 to about 60 minutes, for example about 5 to about 45 minutes, at a pressure of from about 1,000 to about 30,000 psi, for example from about 5,000 to about 20,000 psi. Shear may be defined as the force impacted to decrease the particle size from microns to nanometers.

There may be added to the miniemulsion at any time prior to the formation of the polymeric particles a number of additional ingredients such as at least one free radical initiator. In embodiments, at least one of the additional ingredients can be added to the latomer mixture prior to the shearing. In other embodiments, at least one of the additional ingredients may be added to the miniemulsion. All manners of adding the additional ingredients are encompassed within the present disclosure.

The miniemulsion can further include at least one buffer such as alkali metal carbonates, alkaline earth carbonates, alkali metal bicarbonates, acetates, borates, and the like, and mixtures thereof. In embodiments, the at least one buffer may be added before the formation of the miniemulsion.

The second heating of the latomer mixture can be at a polymerization temperature of, for example, from about 95° C. to about 145° C., more specifically for example from about 110° C. to about 125° C. for a time of, for example, from about 2 hours to about 8 hours, more specifically for example from about 4 hours to about 6 hours. The heating conditions can vary depending on, for example, the scale of the reaction and the results desired.

The second heating of the latomer mixture may result in the formation of polymeric particles. These polymeric particles may be combined with at least one amine to aggregate/coalesce the polymeric particles. In the present disclosure, the at least one amine may be water soluble and may comprise any number of functional groups, for example monoamines, diamines, and triamines, such as JEFFAMINE T-403, a trifunctional alklyetheramine. The at least one amine, in the presence of the polymer comprising the at least one alkylene anhydride, may react to form polymer chains covalently bonded to each other. These can then be used to aggregate chains together, thereby resulting in larger chains and eventually particles.

Although, it is believed that imide formation may be difficult in aqueous systems, such as the water in which the latomer mixture may be stabilized, there is some precedent for imide formation in water. See Seijas, J. et al., "Microwave enhanced synthesis of bowl-shaped triimides with C3-symmetry," Sixth International Electronic Conference on Synthetic Organic Chemistry, Sep. 30, 2002, the disclosure of which is hereby incorporated by reference The at least one amine may be selected from the group consisting of diamine, polyoxypropylenediamine, diethylene triamine, 2-methylpentamethylene diamine, hexane d iamine, hexamethylenediamine, N-isopropyl-N'-phenyl-phenylene diamine, N-(1,3-dimethylbutyl)-N'-phenyl-phenylene-diamine, N, N'-di(2-octyl)4-phenylene diamine, N,N'-bis(1,4-dimethylpentyl)-4-phenylene diamine, dihydroxy tetraphenyl biphenylene diamine (DHTBD), and the like. The amount of the at least one amine used may depend on the amount of the at least one alkylene anhydride. In embodiments, the at least one amine may be present in an amount of from about 0.5% to about 10%, for example from about 1% to about 4% by weight relative to the amount of the toner particle.

The present process, in embodiments, provides for high monomer to polymer conversion levels, or degrees of polymerization, for example, of about 90 percent by weight or greater, or from about 95 to 100 percent, and for example from about 98 to about 100 percent (the conversion percentages refer to all monomers employed in the present process). After heating of the miniemulsion to the second polymerization temperature to form the polymeric particles, the resulting composition containing the polymeric particles may be considered a latex or emulsion.

In embodiments, the present process can further include separating the polymeric particles (which may be solid) from the liquid phase, where such separation can be accomplished by conventional methods, such as filtration, sedimentation, spray drying, and the like known methods.

The weight average molecular weight (Mw) of the resulting polymeric particles can be, for example, of from about 3,000 to about 200,000, and more specifically, for example, about 10,000 to about 150,000. The polymeric particles can, for example, possess a narrow polydispersity of from about 1.1 to about 3, more specifically, for example, from about 1.1 to about 2, and as a further example from about 1.05 to about 1.45. The polymeric particles may have a volume average diameter of, for example, from about 25 nm to about 50 μm, more specifically, for example, from about 100 nm to about 20 μm.

The polymeric particles may be optionally crosslinked with, for example, known crosslinking or curing agents such as divinyl benzene and the like, either in situ or in a separate post-polymerization process procedure. Additional optional known additives may be used in the polymerization reactions which do not interfere with the present process and which may provide additional performance enhancements to the resulting product, for example, colorants, lubricants, release or transfer agents, antifoams, antioxidants, and the like.

In embodiments, there can be incorporated into the latomer mixture, or the miniemulsion, or at any stage of the present process, at least one wax. Non- limiting examples of the wax include polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. The commercially available polyethylenes selected may possess a molecular weight Mw of from about 700 to about 2,500, while the commercially available polypropylenes may possess a molecular weight of from about 4,000 to about 7,000. Examples of functionalized waxes, such as amines and amides include, for example, AQUA SUPERSLIP 6550™, SUPERSLIP 6530™ available from Micro Powder Inc.; fluorinated waxes, for example POLYFLUO 190™, POLYFLUO 200™, POLYFLUO 523XF™, AQUA POLYFLUO 411™, AQUA POLYSILK 19™, and POLYSILK 14™ available from Micro Powder Inc., mixed fluorinated, amide waxes, for example MICROSPERSION 19™ also available from Micro Powder Inc.; imides, esters, quaternary amines, carboxylic acids or acrylic polymer emulsions, for example JONCRYL 74™, 89™, 130™, 537™, and 538™, all available from SC Johnson Wax; chlorinated polypropylenes and polyethylenes available from Allied Chemical and Petrolite Corporations, and S C Johnson wax. Suitable low molecular weight waxes are disclosed in U.S. Pat. No. 4,659,641, the disclosure of which is totally incorporated herein by reference.

The at least one wax may be present in amounts of from about 0.1 to about 15 weight percent, and for example from about 2 to about 10 weight percent of the total monomer polymerized. Alternatively, the at least one wax may be added to the isolated polymeric product of the process. The use of such a component may be desirable for certain toner applications.

Toner compositions can be prepared by a number of known methods, such as admixing and heating resin, or polymer particles obtained with the processes of the present disclosure in a toner extrusion device, such as the ZSK53 available from Werner Pfleiderer, and removing the formed toner composition from the device. Subsequent to cooling, the toner composition may be subjected to grinding utilizing, for example, a Sturtevant micronizer for the purpose of achieving toner particles with a volume median diameter of less than about 25 μm, and for example from about 6 to about 14 μm, which diameters are determined by a Coulter Counter. Other methods include those well-known in the art such as spray drying, melt dispersion, emulsion aggregation, and extrusion processing. Subsequently, the toner compositions can be classified utilizing, for example, a Donaldson Model B classifier for the purpose of removing toner fines, i.e., toner particles less than about 4 μm volume median diameter. Alternatively, the toner compositions may be ground with a fluid bed grinder equipped with a classifier wheel. In embodiments, a toner can be prepared directly, thereby foregoing the extensive particle sizing and separation process by including, for example, at least one colorant in the miniemulsion droplets prior to polymerization, and thereafter isolating the resulting colored toner particles.

Emulsion aggregation processes suitable for making the disclosed toner particles are illustrated in a number of patents, the disclosures of which are totally incorporated herein by reference, such as U.S. Pat. Nos. 5,278,020; 5,290,654; 5,308,734; 5,344,738; 5,346,797; 5,348,832; 5,364,729; 5,366,841; 5,370,963; 5,376,172; 5,403,693; 5,418,108; 5,405,728; 5,482,812; 5,496,676; 5,501,935; 5,527,658; 5,585,215; 5,593,807; 5,604,076; 5,622,806; 5,648,193; 5,650,255; 5,650,256; 5,658,704; 5,660,965; 5,723,253; 5,744,520; 5,763,133; 5,766,818; 5,747,215; 5,804,349; 5,827,633; 5,853,944; 5,840,462; 5,863,698; 5,869,215; 5,902,710; 5,910,387; 5,916,725; 5,919,595; 5,922,501; 5,925,488; 5,945,245; 5,977,210; 6,017,671; 6,020,101; 6,045,240; 6,132,924; 6,143,457; and 6,210,853. The components and processes of the patents can be selected for the present disclosure in embodiments thereof.

The colorant may be chosen from dyes and pigments, such as those disclosed in U.S. Pat. Nos. 4,788,123; 4,828,956; 4,894,308; 4,948,686; 4,963,455; and 4,965,158, the disclosures of all of which are hereby incorporated by reference. Non-limiting examples of the pigment include black, cyan, magenta, yellow, green, orange, brown, violet, blue, red, purple, white, and silver. Non-limiting examples of the colorant include carbon black (for example, REGAL 3300®), Flexiverse Pigment BFD1121, nigrosine dye, aniline blue, magnetites and colored magnetites, such as Mobay magnetites M08029™, M08060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™, Magnox magnetites TMB-100™, or TMB-104™; phthalocyanines, 2,9-dimethyl-substituted quinacridone and anthraquinone dyes identified in the Color Index as Cl 60710, Cl Dispersed Red 15, diazo dyes identified in the Color Index as Cl 26050, Cl Solvent Red 19, copper tetra (octadecyl sulfonamide) phthalocyanine, x-copper phthalocyanine pigment listed in the Color Index as Cl 74160, Cl Pigment Blue, Anthradanthrene Blue identified in the Color Index as Cl 69810, Special Blue X-2137, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-d imethoxy-4-su ifonanilide phenylazo-4'-chloro-2, 5-dimethoxy acetoacetanilide, Permanent Yellow FGL, Pigment Yellow 74, B 15:3 cyan pigment dispersion, commercially available from Sun Chemicals, Magenta Red 81:3 pigment dispersion, commercially available from Sun Chemicals, Yellow 180 pigment dispersion, commercially available from Sun Chemicals, cyan components, and the like, as well as mixtures thereof. Other commercial sources of pigments available as aqueous pigment dispersion from either Sun Chemical or Ciba include, but are not limited to, Pigment Yellow 17, Pigment Yellow 14, Pigment Yellow 93, Pigment Yellow 74, Pigment Violet 23, Pigment Violet 1, Pigment Green 7, Pigment Orange 36, Pigment Orange 21, Pigment Orange 16, Pigment Red 185, Pigment Red 122, Pigment Red 81:3, Pigment Blue 15:3, and Pigment Blue 61, and other pigments that enable reproduction of the maximum Pantone color space. Other suitable colorants include, but are not limited to, Cinquasia Magenta (DuPont), Levanyl Black A-SF (Miles, Bayer), Sunsperse Carbon Black LHD 9303, Sunsperse Blue BHD 6000 and Sunsperse Yellow YHD 6001 available from Sun Chemicals; Normandy Magenta RD-2400, Permanent Yellow YE 0305, Permanent Violet VT2645, Argyle Green XP-111-S, Lithol Rubine Toner, Royal Brilliant Red RD-8192, Brilliant Green Toner GR 0991, and Ortho Orange OR 2673, all available from Paul Uhlich; Sudan Orange G, Tolidine Red, and E.D. Toluidine Red, available from Aldrich; Sudan III, Sudan II, and Sudan IV, all available from Matheson, Coleman, Bell; Scarlet for Thermoplast NSD PS PA available from Ugine Kuhiman of Canada; Bon Red C available from Dominion Color Co.; Lumogen Yellow D0790, Suco-Gelb L1250, Suco-Yellow D1355, Paliogen Violet 5100, Paliogen Orange 3040, Paliogen Yellow 152, Neopen Yellow, Paliogen Red 3871 K, Paliogen Red 3340, Paliogen Yellow 1560, Paliogen Violet 5890, Paliogen Blue 6470, Lithol Scarlet 4440, Lithol Fast Scarlet L4300, Lithol Scarlet D3700, Lithol Fast Yellow 0991 K, Paliotol Yellow 1840, Heliogen Green L8730, Heliogen Blue L6900, L7202, D6840, D7080, Neopen Blue, Sudan Blue OS, Sudan Orange 220, and Fanal Pink D4830, all available from BASF; Cinquasia Magenta available from DuPont; Novoperm Yellow FG1 available from Hoechst; Hostaperm Pink E, and PV Fast Blue B2G01 all available from American Hoechst; Irgalite Blue BCA, and Oracet Pink RF, all available from Ciba-Geigy. Mixtures of colorants can also be employed.

The optional colorant may be present in the toner composition in any desired or effective amount, such as from about 1% to about 25% by weight of the toner composition, and for example from about 2% to about 15%, and as a further example from about 5% to about 12% by weight based upon the total weight of the toner composition. The amount can, however, be outside of these ranges.

In embodiments, styrene-maleic anhydride resins may have covalently bonded thereto at least one colorant and may generally be the reaction product of a monomeric colorant and styrene-maleic anhydride. Copolymers of anhydrides with styrene, butadiene, methoxyvinylether, ethylene, alpha-olefins, mixtures thereof, and the like, are all suitable examples of polymeric materials with which the monomeric colorants of the present disclosure can be reacted to form colored polymeric materials.

The toner composition optionally can also comprise a charge control additive, such as alkyl pyridinium halides, including cetyl pyridinium chloride and others as disclosed in U.S. Pat. No. 4,298,672, the disclosure of which is hereby incorporated by reference, sulfates and bisulfates, including distearyl dimethyl ammonium methyl sulfate as disclosed in U.S. Pat. No. 4,560,635; the disclosure of which is hereby incorporated by reference, and distearyl dimethyl ammonium bisulfate as disclosed in U.S. Pat. Nos. 4,937,157; 4,560,635, and copending application Ser. No. 07/396,497, abandoned, the disclosures of all of which are hereby incorporated by reference, zinc 3,5-di-tert-butyl salicylate compounds, such as Bontron E-84, available from Orient Chemical Company of Japan, or zinc compounds as disclosed in U.S. Pat. No. 4,656,112, the disclosure of which is totally incorporated by reference, aluminum 3,5-di-tert-butyl salicylate compounds such as Bontron E-88, available from Orient Chemical Company of Japan, or aluminum compounds as disclosed in U.S. Pat. No. 4,845,003, the disclosure of which is hereby incorporated by reference, charge control additives as disclosed in U.S. Pat. Nos., 3,944,493; 4,007,293; 4,079,014; 4,394,430; 4,464,452; 4,480,021; and 4,560,635, the disclosures of all of which are hereby incorporated by reference, and the like, as well as mixtures thereof.

The optional charge control additive may be present in the toner composition in an amount of from about 0.1% to about 10% by weight, for example from about 1% to about 5% by weight with respect to the total weight of the toner composition. The amount can, however, be outside this range.

The toner composition may also optionally comprise an external surface additive, including flow aid additives, which additives may be usually present on the toner surface thereof. Non-limiting examples of the external surface additive include metal oxides like titanium oxide, tin oxide, mixtures thereof, and the like, colloidal silicas, such as AEROSIL®, metal salts and metal salts of fatty acids inclusive of zinc stearate, aluminum oxides, cerium oxides, and mixtures thereof. Several of the aforementioned additives are illustrated in U.S. Pat. Nos. 3,590,000 and 3,800,588, the disclosures of which are totally incorporated herein by reference. Moreover, the external surface additive may be a coated silica of U.S. Pat. Nos. 6,004,714; 6,190,815 and 6,214,507, the disclosures of which are totally incorporated herein by reference. The external surface additive can be added during the aggregation process or blended onto the formed toner particles.

The optional external surface additive may be present in any desired or effective amount of from about 0.1% to about 5% by weight, for example from about 0.1% to about 1% by weight with respect to the total weight of the toner composition. The amount can, however, be outside this range.

The disclosure will now be described in detail with respect to specific embodiments thereof, it being Understood that these examples are intended to be illustrative only and the disclosure is not intended to be limited to the materials, conditions, or process parameters recited herein. All percentages and parts are by weight unless otherwise indicated.

EXAMPLES

Example 1

Incorporation of Maleic Anhydride at the Latex Step.

To a bulk polymerized styrene/butylacrylate (200 ml, ~20% conversion—Mn=1900) was added maleic anhydride (16 g). The mixture was heated to ~50° C. until all the maleic anhydride dissolved. This was added to an aqueous solution (600 g water and sodium dodecylbenzenesulfonate (SDBS), 16 g) and stirred for 5 minutes. The resulting mixture was piston homogenized 3 times at 500 BAR and then transferred to a 1L BUCHI reactor. Pressurizing with argon and then depressurizing (5 times) deoxygenated the latex mini-emulsion. This was then heated to 135° C. After 1 hour at temperature, a solution of ascorbic acid (8.5 ml of a 0.1 g/ml concentration) was added via pump at the rate of 0.035 ml/minute. The reaction was cooled after 6 hours to afford a resin in the latex of ~200 microns with a solids content of 24.9% and Mn=9,700 and Mw=23,000.

Example 2

Aggregation of Latex Using Diamines.

To a stable free radical polymerization latex (707 g, 23.48% solids content) was added 660 ml of water and pigment (cyan blue-BTD-FX-20, 47.8 g). This was stirred at room temperature and a diamine (Jeffamine D400, 6.89 g in 100 ml water) was added over a 10 minute period. The resulting thickened suspension was heated to 55° C. over a 1 hour period. The suspension was then basified using NaOH (concentrated) to a pH of 7.3. This was subsequently heated to 95° C. over a 2 hour period and maintained at temperature for 5 hours. The suspension was then cooled, filtered, and washed 5 times with water until the filtrate conductivity was less than 15 microSiemens/$cm^2$. The resulting powder was resuspended in minimal water and freeze dried to give 130 g of a 13.4 μm particle.

Example 3

Incorporation of Maleic Anhydride at the Bulk Polymerization Step.

A stock solution of styrene (390 mL) and butylacrylate (110 ml) was prepared and to 400 ml was added TEMPO (3.12 g, 0.02 mole) and vazo 64 initiator (2.0 g, 0.0125 mole). This was heated under a nitrogen atmosphere to 135° C. (bath temperature) and then added to it dropwise a solution of maleic anhdryide (9.8 g) in 100 mL of the styrene/butylacrylate stock solution which had been deoxygenated using nitrogen. The addition was done over a 30 minute period after which it was stirred for 5 more minutes and then cooled to afford a poly(styrene/maleic anhydride-b-styrene/butylacrylate) (Mn=4990 with PD=1.23) solution in styrene/butylacrylate monomer.

Example 4

Preparation of Poly(SMA-b-S/BA) Latex.

A polymer solution of example 3 (300 ml), styrene (117 ml), butylacrylate (33 ml) and TEMPO (0.6 g) was added to a solution of SDBS (36 g, 1.2 l water) and stirred for 5 minutes. Then the mixture was piston homogenized once at a pressure of about 500 BAR and then discharged into a 2L BUCHI reactor. This was heated to 135° C. (reactor temperature) and when the reactor reached temperature a solution of ascorbic acid (2.4 g in 12 ml water) was added dropwise at a rate of 0.0283 mil/minute for a total of 8.5 ml. After 6 hours at reaction temperature the reactor was cooled and 1401.3 g of latex was discharched affording a poly(styrene/maleic anhydride-b-styrene/butylacrylate) (Mn=39,168 with PD=1.64).

Example 5

Aqgregation/Coalescence of Latex Using Diamine as Agaregant.

To the latex prepared in example 4 (50 ml) was added 50 ml of water and stirred at room temperature while adjusting the pH to ~1.78. To this was added dropwise 2.89 g of a Jeffamine D400 solution (20% w/w in water) at 23-25° C. and then slowly heated up to 60° C. over ~1 hour. The particle size grew from about 200 nm to 6.8 μm. The solution pH was adjusted to pH 9.04 with dilute NaOH and then further heated slowly to 95° C. over the course of ~1.5 hour and maintained at temperature for 1.5 hours to afford a coalesced white particle of 6.68 μm size (Mn=39,168).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a resin" includes two or more different resins. Moreover, reference to "at least one resin" includes for example from 1 to about 7, from 2 to about 5, from 1 to about 3, and yet more specifically one, resin. As used herein, the term "include" and its grammatical variants are intended to be non-limiting, such that recitation of items in a list is not to the exclusion of other like items that can be substituted or added to the listed items.

While particular embodiments have been described, alternatives, modifications, Variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprising:

providing a resin miniemulsion comprising polymeric particles comprising at least one free radical polymerizable monomer compound and at least one alkylene anhydride; and a surfactant;

blending the miniemulsion with at least one colorant, at least one amine to aggregate and coalesce the polymeric particles, and optionally at least one wax;

heating the resulting mixture below or equal to the glass transition temperature (Tg) of the resin emulsion; and heating the resulting mixture above or about equal to the glass transition temperature (Tg) of the resin emulsion, wherein the at least one amine is selected from the group consisting of polyoxypropylenediamine, N-isopropyl-N'-phenyl-phenylene diamine, N-(1,3-dimethylbutyl)-N'-phenyl-phenylene-diamine, N,N'-di(2-octyl)-4-phenylene diamine, N, N'-bis(1,4-dimethylpentyl)-4-phenylene diamine, and dihydroxy tetraphenyl biphenylene diamine, and wherein the at least one amine is present in the miniemulsion in an amount of from about 0.5 to about 10% by weight relative to the amount of the polymeric particles.

2. The process of claim 1, wherein the at least one free radical polymerizable monomer compound and the least one alkylene anhydride react in a molar ratio of about 1:1.

3. The process of claim 1, wherein the polymeric particles have a volume average diameter of from about 25 nm to about 50 μm.

4. A toner obtained by the process of claim 1 and which toner further comprises at least one colorant.

* * * * *